Nov. 10, 1959 E. P. MATTHEWS 2,911,945
APPARATUS FOR DEVELOPING ELECTROSTATIC IMAGES
Original Filed May 13, 1955 3 Sheets-Sheet 1

INVENTOR.
EARNEST PAUL MATTHEWS
BY
ATTORNEY

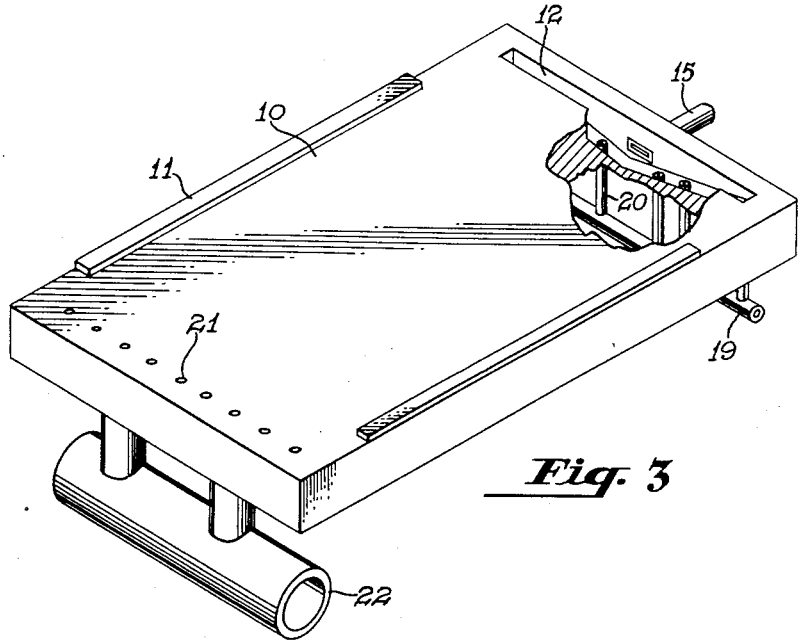
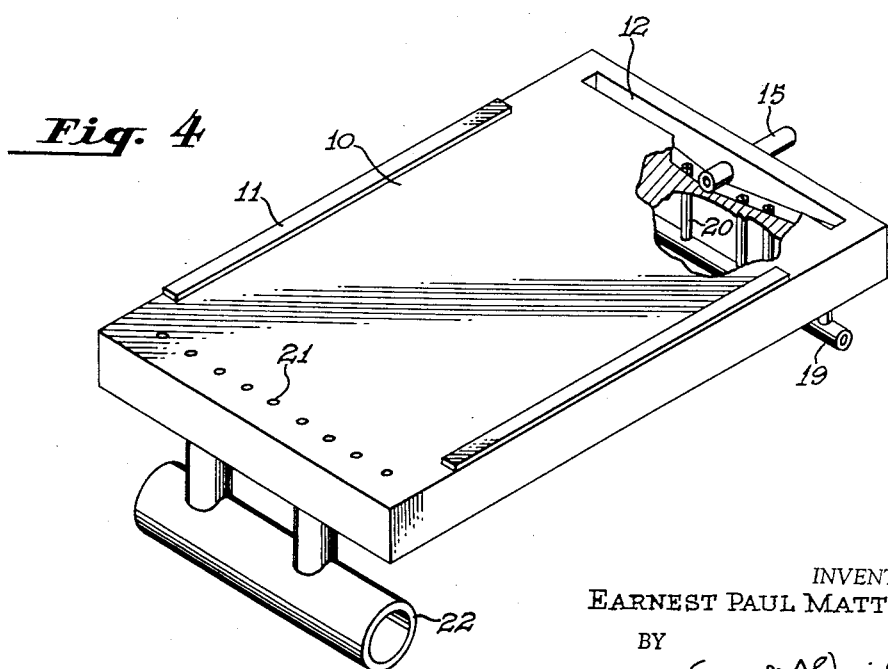
INVENTOR.
EARNEST PAUL MATTHEWS

INVENTOR.
EARNEST PAUL MATTHEWS
BY
ATTORNEY

United States Patent Office 2,911,945
Patented Nov. 10, 1959

2,911,945

APPARATUS FOR DEVELOPING ELECTROSTATIC IMAGES

Earnest Paul Matthews, Alliance, Ohio, assignor to Haloid Xerox, Inc., a corporation of New York Original application May 13, 1955, Serial No. 508,129, now Patent No. 2,859,127, dated November 4, 1958. Divided and this application February 13, 1957, Serial No. 639,962

5 Claims. (Cl. 118—637)

This invention relates to an apparatus for the development of electrostatic latent images.

In xerography it is usual to form an electrostatic latent image on a surface. One method of doing this is to charge a photoconductive insulating surface and then dissipate the charge selectively by exposure to a pattern of activating radiation. Other means of forming electrostatic latent images are set forth in U.S. 2,647,464 to James P. Ebert. Whether formed by these means or any other, the resulting electrostatic charge pattern is conventionally utilized by the deposition of an electroscopic material thereon through electrostatic attraction whereby there is formed a visible image of electroscopic particles corresponding to the electrostatic latent image. Alternatively, the electrostatic charge pattern may be transferred to an insulating film and the electroscopic particles deposited thereon to form the visible image. In any case, this visible image, in turn, may be transferred to a second surface to form a xerographic print.

The process of depositing the electroscopic powder on the electrostatic image to render the electrostatic image visible is called the "development step" and is one of the most critical steps of the entire process. The step is of particular importance both on machines designed for continuous operation with any type of copy and in processing continuous-tone images. Now, in accordance with the present invention, an apparatus is provided for substantially improved development of an electrostatic latent image.

Fig. 1 of the attached drawings is a block diagram showing the position of the development step in an overall xerographic process which results in a visible image.

Fig. 3 is an isometric drawing of apparatus according to another embodiment of the invention with a cutaway section to show greater detail of the apparatus.

Fig. 4 is an isometric drawing of apparatus according to another embodiment of the invention with a cutaway section to show greater detail of the apparatus.

Figure 1:
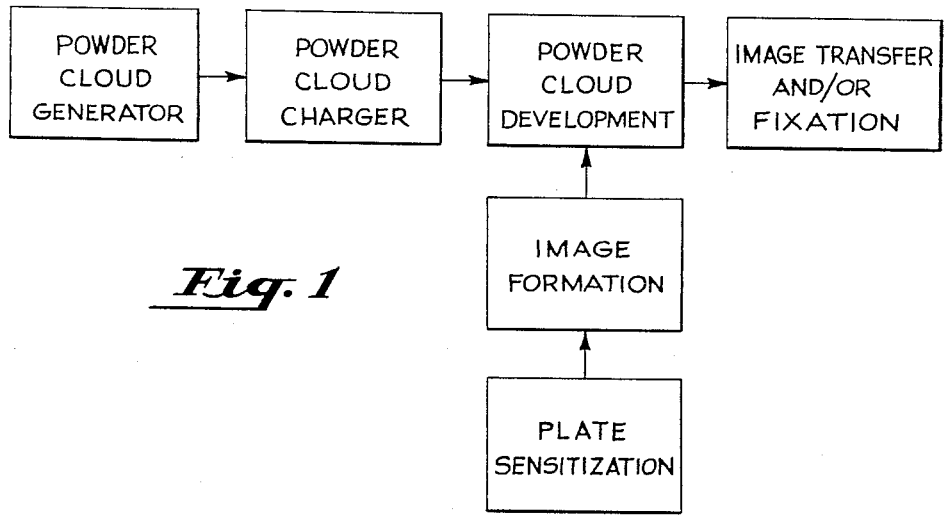

As shown in Fig. 1, the general xerographic process involves the formation of an electrostatic latent image. This is generally, although not always, preceded by a treatment to sensitize the surface on which the electrostatic image is to be formed. The electrostatic latent image to be useful must then be rendered visible, which is done in a development step. This is accomplished by depositing electroscopic particles either on the surface on which the image was formed or on an insulating surface to which the electrostatic latent image has been transferred.

It is evident that no picture can be better than the development step permits. About the coarsest type of image reproduced by a xerographic process requires a resolution of at least about 50 lines per inch. Commercial line-copying xerographic machines generally have a resolution power of about 125 to 250 lines per inch. The process used in obtaining this resolution is set forth in U.S. 2,618,552 and involves the use of a finely-divided, colored material called a "toner" deposited on a slightly more coarsely-divided material called a "carrier." This two-component developer is cascaded across the electrostatic image areas. The control of the concentration of toner in the two-component developer becomes extremely difficult in the continuous operation of such line copy machines. When applied to continuous-tone development where resolutions of about 1200 or more lines per inch are often desired, it has been found impossible to obtain this high quality of reproduction using such a system. Accordingly, a system known as "powder cloud development" is preferred. This is the system incorporated in Fig. 1.

As shown in Fig. 1, a powder cloud is generated. The cloud so produced is then charged, the charging step constituting either a separate step or utilizing the inherent charge on the cloud in the case of a cloud of dry particles. A cloud so generated and charged is then contacted with the electrostatic latent image in the development step. The visible image so produced may be used as such, permanently affixed to the plate, or may be transferred to another material as a sheet of paper or plastic, as is well-known to those skilled in the xerographic art.

The instant invention relates to an apparatus therefor which represents a substantial improvement in the art of powder cloud development. While powder cloud development is the only method now known to be capable of producing the quality necessary for pictures requiring high resolution, it has several drawbacks; for instance, in an automatic camera with a processing cycle of only 15 seconds, the actual development of the image on the plate probably should not take more than two or three seconds, and one second would be preferable. In addition, this should be obtainable without sacrifice in image quality and with completely uniform development over the entire area of the plate. The process of the instant invention represents substantial improvement in all these.

In general, the present invention accomplishes these objectives by introducing the powder cloud to an entrance chamber whose length corresponds to one dimension of the image-bearing member. In this chamber or in a separate chamber prior thereto, additional air is blended with the powder cloud, and the combined cloud and additional air admitted to the development zone through an entrance slot of the same length as the entrance chamber. By the term "development zone" as used herein is meant, of course, the "area between the development electrode and the image-bearing surface."

The process of the invention and apparatus for its accomplishment will now be set forth in more detail.

According to the present invention, a cloud of electroscopic particles is generated in a cloud-forming device; for example, as by agitation of a powder mass in a closed container with a rotating brush, or a rotating air mass as caused by laterally-located nozzles, or by removing powder from a uniformly-loaded belt through an aspirator. The cloud, by whatever means produced, is then charged. Generating a cloud of dry particles almost necessarily produces a charge thereon. For some purposes, the charge so produced will be adequate. If it is desired to produce a more uniform charge, however, other devices such as triboelectric charging (as by passing the electroscopic powder through a narrow tube of suitable material in turbulent flow), corona charging, or other device may be used. The charged cloud is then passed into an entrance chamber whose length corresponds roughly to the length of the side of the image lying parallel to the chamber, the chamber having an entrance slot of the same length. In this chamber, additional air is added to the powder cloud at a point no closer to the entrance slot than the point of addition of the powder cloud to the chamber, mixed therewith, and the combined air-powder flow admitted to the development zone through the entrance slot. Desirably, though not necessarily, the entrance slot is so positioned as to cause the combined air-powder flow to change direction about 90° with its original direction of flow to pass into the development zone. It is believed that this helps in further deagglomerating powder particles thereby reducing graininess in the finished prints. The development electrode in the development zone acts to draw the lines of force of the electrostatic image externally from the image-bearing surface. The relatively uniform powder cloud passes in approximately laminar flow on a front approximately the length of the chamber along the image-bearing surface through this field of force leaving through exhaust means (holes, slot, etc.) at the opposite end of the electrode. To be effective in drawing the electrostatic image externally from the image-bearing surface, the development electrode should be no more than 1/8" from the image-bearing member. For high quality resolution, the spacing should be no more than 1/40". As a result of this process, the electroscopic particles are deposited on the image-bearing member thereby forming a visible or developed image corresponding faithfully to the electrostatic latent image. This visible powder image then is used by further steps of the xerographic process as, for example, by transfer, fixing, or other means to yield a xerographic print or to yield other useful forms of the electrophotographic image.

The general nature of the process of the invention having been set forth, some specific embodiments of the invention will now be described. The invention is not limited to these embodiments, however, and they are merely presented for purposes of illustrating means of working the instant invention.

Figure 2:
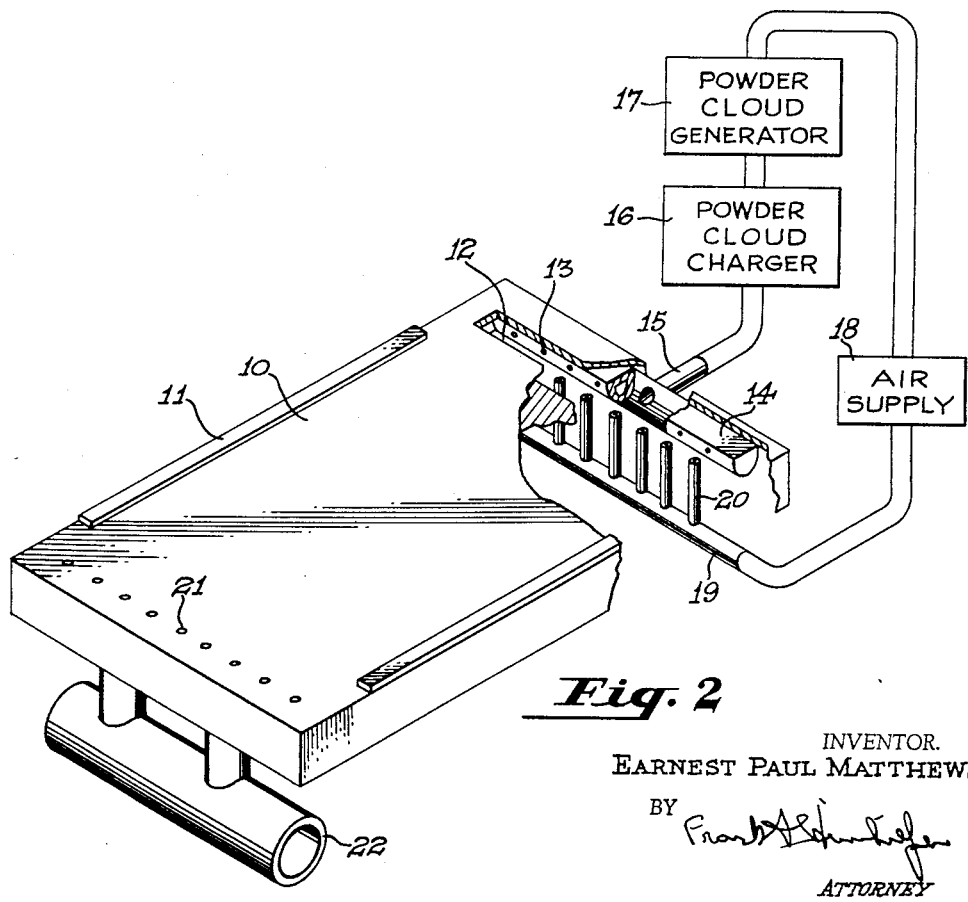
Fig. 2 is an isometric drawing of apparatus according to one embodiment of the invention with a cutaway section to show greater detail of the apparatus.

As shown in Fig. 2, the apparatus illustrated includes a development electrode 10. Positioned thereon are insulating spacers 11 for positioning an image-bearing member, such as a xerographic plate (i.e., a photoconductive insulating layer coated on a conductive backing), at the correct distance from the development electrode and insulating the plate electrically from the electrode. At one end of the development electrode is an entrance chamber 12 fed by jets 13 which in turn connect to a manifold 14. A tube 15 connects the manifold to the powder cloud charger 16 which is fed by the powder cloud generator 17. Additional air from supply 18 is fed through tube 19 to jets 20 which lead the air to the entrance chamber 12. At the opposite end of the electrode are exhaust means 21 connected to an exhaust tube 22.

In operation, the powder cloud is generated, charged, led through tube 15 to the manifold 14 where the cloud fans out and enters the entrance chamber 12 through jets 13. In the entrance chamber, the powder cloud is mingled with air from air jets 20. The augmented powder cloud then enters the development zone through the top of the entrance chamber, which constitutes the entrance slot to the development zone. A xerographic plate, not shown, is positioned adjacent to the development electrode and closely spaced therefrom by spacers 11 thereby forming the development zone. The augmented powder cloud flows through the development zone leaving through the exhaust means 21. If desired, a slight vacuum (i.e., a few pounds below atmospheric pressure) may be maintained at the exhaust means. In the particular apparatus shown, the jets 13 feeding the powder cloud are 0.020" internal diameter and the jets 20 feeding the additional air to the entrance chamber are each 0.064" internal diameter. As a result of this process, electroscopic particles are deposited on the image areas of the xerographic plate from the powder cloud. Development times of 1 second are easily obtained, with the resulting images being essentially uniform from side to side and having a high tonal quality.

The apparatuses shown in Figs. 3 and 4 are essentially similar to that in Fig. 2 with the exception of the means taken to feed the powder cloud to the entrance chamber. Because of the similarity the same numbers have been used in Figs. 3 and 4 as were used in Fig. 2, and the parts denoted by them are identical in both name and function in the three apparatuses. Thus, in Fig. 3 the entrance chamber 12 is delta-shaped rather than rectangular but is still an entrance chamber in both name and function. The tube 15 here leads the powder cloud directly from the powder cloud charger to the entrance chamber rather than to an intermediate manifold chamber. The cloud is fed from the tube to the entrance chamber by means of a slot which, in this particular case, was 0.008" high and about 5/16" long. The method of operation was, of course, identical with that of the apparatus in Fig. 2.

Fig. 4 differs from Fig. 3 only in that the powder cloud is admitted to the delta-shaped entrance chamber by means of two jets, one each on opposite sides of the tube 15. These jets admit the powder cloud lengthwise to the entrance chamber. In this particular case, the jets were each 0.040" in diameter.

With the exception of the thickness of the development zone, where the development electrode should be no further than about 1/8" from the image-bearing surface, none of the dimensions are critical. The rate of powder flow also may vary widely without affecting image quality. While speed of development is affected somewhat, the rate of flow may actually vary a great deal without deleterious effect. Thus, the apparatuses shown have been used with air pressures on the powder cloud ranging from 15 p.s.i.g. to 40 p.s.i.g. with, in each case, an additional air flow from a pressure head of 5 p.s.i.g. with development time varying only from 1 second to 1½ seconds.

The process of this invention is suitable for use in a continuous process. A machine adapted for such a process is the rotating drum type wherein a photoconductive insulating layer (selenium, anthracene, etc.) is coated on the curved surface of a cylindrical drum. The various steps of the overall xerographic process as shown in Fig. 1 are carried out around the periphery of the curved surface as the image is moved from step to step by rotating the drum on its lengthwise axis. The development electrode is curved to obtain the proper uniform spacing for the development zone. Development may occur as the drum is rotated uniformly and continuously in one direction, or stepwise as where a given arc on the drum's periphery, say four inches, is advanced in one step and the drum stopped for a set period, say one second, to permit development, then the step is repeated.

Generally, the powder cloud is charged with a charge of polarity opposite to the polarity of the electrostatic image. However, this is not necessarily so. Thus, reversal development may be effected by charging the powder cloud with a charge having the same polarity as the image areas. Hence, the powder is repelled from the image. When a field is applied by the development electrode which opposes the image field, the powder is forced to the uncharged "background" areas to develop a reversal print.

Grounding the development electrode is sufficient to draw the lines of force of the image areas externally from the image-bearing surface. However, the development electrode is capable of a far more flexible operation than this. Thus, the quality and character of images can be controlled by placing various potentials on the electrode. It is often desirable to vary the maximum and minimum density of a print, to control the contrast, and in some cases, to accentuate the development of areas having a given charge density. To increase the brightness of highlights, a field is applied by the development electrode which cancels the field from the highlight areas. To increase the overall density, a field may be applied to aid the deposition of powder over the entire image-bearing surface.

To emphasize the darker areas of the image, a potential may be applied to the electrode for, say, 50% of the time, which is sufficient to produce a field strength which will cancel or reverse the field from all except the most highly-charged image areas. During this period, only the charged areas are developed. For another period, say 40% of the development time, the potential is lowered to permit some development of intermediate tones along with further development of dark areas, and finally, for the last 10% of the cycle, the potential may be lowered still further to allow a slight fill-in in the lighter areas. Other forms of development can also be achieved with such a system.

Figure 5:
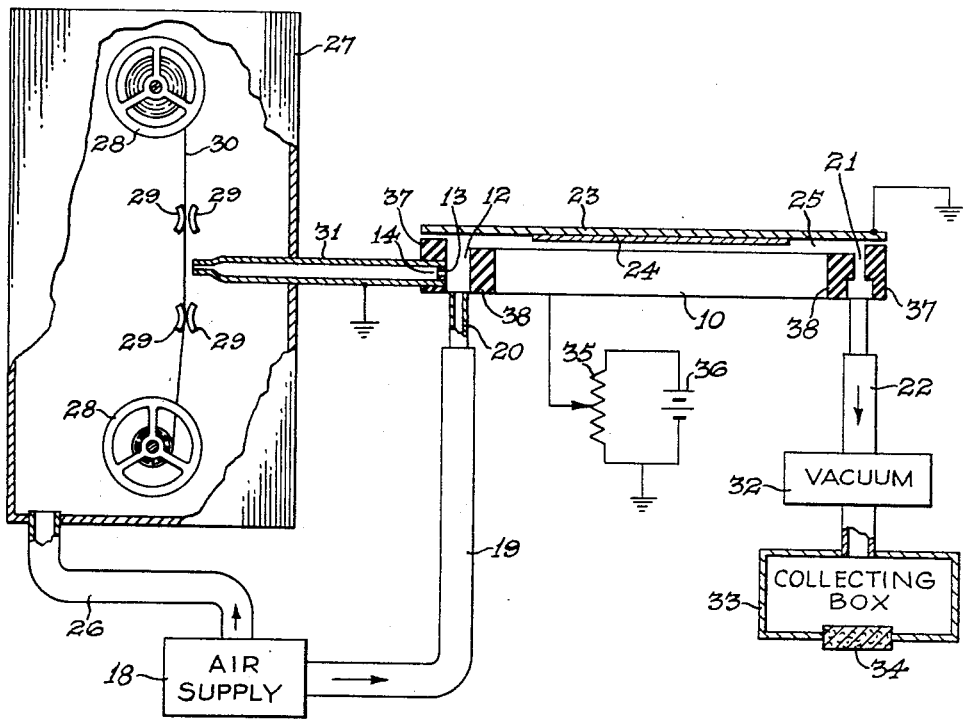
Fig. 5 is a semidiagrammatic illustration of apparatus according to another embodiment of the invention.

Referring to Fig. 5, there is illustrated semi-diagrammatically a further embodiment of the invention. This embodiment is particularly adapted for reversal development and tone control development, as just described, by varying the potential on the development electrode. This embodiment is similar to the embodiment illustrated in Fig. 2 but provides means for varying the bias of the development electrode and shows further details of the powder cloud generator, powder cloud exhaust, powder cloud charger, and the positioning of the electrostatic image-bearing member.

According to this embodiment, an air or gas supply 18 is provided from which a tube or conduit 26 leads to an air-tight housing 27. Within this housing are positioned reels 28 carrying a powder impregnated ribbon 30. The reels 28 are so mounted that the ribbon 30 passes over guides 29 which lead the ribbon past nozzle 39 of tube 31. The reels are spring or motor driven in order to move the ribbon at a controlled rate. In practice, the nozzle 39 and the ribbon 30 are relatively close together. The air supply 18 maintains the housing 27 at a pressure greater than ambient whereby a jet of gas is forced through the nozzle 39 bearing with it a supply of powder-in-gas suspension from the powder impregnated ribbon 30 into the tube 31. The gas suspension of powder particles passes through tube 31 into manifold 14 where it spreads out to pass through jets 13 into the entrance chamber 12. The tube 31, the nozzle 39, the manifold 14, and the jets 13 are constructed of a conductive material, such as metal, so chosen, in relationship to the powder used to impregnate the ribbon material, that the powder is charged predominantly to the desired polarity by triboelectric contact with the walls of the nozzle, tube, and jets which are grounded. Desirably, the powder will consist of charcoal. A suitable metal for tube 31, nozzle 39, manifold 14, and jets 13 is copper, while napped cotton flannel may be used for the ribbon.

The air supply 18 also supplies air through tube or conduit 19 to jets 20 which feed additional air into the entrance chamber 12 where it combines with the powder cloud. The augmented powder cloud passes through entrance chamber 12 into development zone 25, formed by positioning a xerographic plate consisting of a conductive backing 23 having coated thereon a photoconductive insulating layer 24. This plate rests on insulating spacers 37. Means are provided to ground the conductive backing of the xerographic plate.

The development electrode 10 is positioned at a distance of no more than about one-eighth inch from the photoconductive insulating layer 24 and desirably, for good photographic quality of the developed image, no more than $\frac{1}{40}''$. The development electrode 10 is insulated from the rest of the assembly by means of insulating spacers 38. The insulating spacers 37 position the xerographic plate at the correct distance from the development electrode and act as dust seals at the ends of the xerographic plates. Insulating spacers 11, as shown in Fig. 2, serve the same function for the sides of the assembly.

The powder cloud passes over the photoconductive insulating layer 24 depositing electroscopic particles on the charged portions thereof and leaves the development zone 25 through means 21 whereby it is fed into exhaust means 22. A slight negative pressure is kept on the exhaust means by suitable means 32. The powder passes through 32 into a collecting box 33 wherein the powder is separated from the gas suspension by a filter 34.

Means are provided for applying an electric potential difference between the backing member 23 of the xerographic plate and the development electrode 10. These means may include, for example, a battery 36 or similar D.C. power source connected through a potentiometer 35 to one or the other of the xerographic plate or the development electrode; in the embodiment shown it is connected to the development electrode.

Many variations of the apparatus will instantly be apparent. Thus, in the place of the insulating spacers 37 at each end of the assembly there may be substituted therefor conductive spacers which will position the xerographic plate at the correct distance from the development electrode 10 and serve as dust seals. With this change, the ground on the powder cloud supplying means, here shown connected to tube 31, will ground the spacer 37 and the conductive backing of the xerographic plate 23 when placed thereon. This eliminates the necessity of a separate ground for the conductive backing 23. Insulating means 38 will suffice along with insulating strips 11 shown in Fig. 2 to keep the development electrode 10 electrically insulated from the rest of the assembly.

Figure 6:
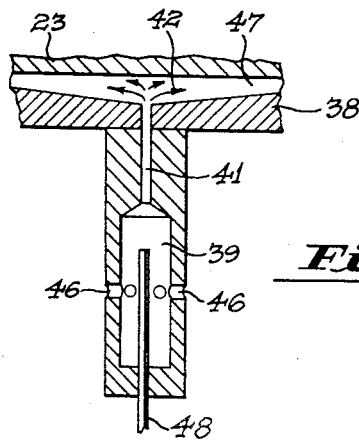
Fig. 6 is a cross-section of apparatus according to another embodiment of the invention.

The section in Fig. 6 shows another embodiment of apparatus according to the invention. In this embodiment, the powder cloud and additional air are mixed in a separate chamber prior to admission to the entrance chamber. As shown, the apparatus includes tubes 46 for injecting additional air into a mixing chamber 39. A capillary tube 48 introduces a suspension of finely-divided material in gas or air into the chamber 39 at a point between the point of introduction of additional air 46 and the exit from the mixing chamber 39 through tube 41. Tube 41, in turn, connects the mixing chamber with the entrance chamber 47. The top of the entrance chamber 47 is formed by the conductive portion 23 of a xerographic plate.

In operation, a powder cloud generated by suitable means, as shown in Fig. 5 is conducted by means of capillary 48 to the mixing chamber 39. The capillary tube 48 is constructed of conductive material, such as metal, and is grounded. The developer particles are in turbulent flow, and through repeated contact with the walls of capillary 48 become charged through the triboelectric contact. Additional air is added to the mixing chamber 39 through tubes or conduits 46. The additional air and the cloud of finely-divided material mingle in chamber 39 and pass through tube or conduit 41 to a delta-shaped entrance chamber 47. As shown, the finely-divided material enters the entrance chamber 47 and is forced by means of the conductive portion 23 of the xerographic plate to flow along the length of the chamber 47 as shown by the arrows 42. The decreasing depth of the entrance chamber 47 as the distance from point of entrance of the gas suspension at 41 is increased acts to even out the flow of the powder cloud over the width of the development electrode. As shown, 38 is a part of the development electrode and is preferably constructed of an insulating material to permit varying the potential of the development electrode itself. The remaining portions of the development electrode and xerographic plate positioning means may be as shown in Fig. 5, and the manner of operation would, of course, be identical with the remaining portions of the other system as shown in Fig. 5.

Whatever system of development is used in the process of the instant invention, it is characterized by extremely high speed development without loss of tonal quality and with relatively uniform development from side-to-side of the entire image.

This application is a division of my copending application Serial Number 508,129, filed May 13, 1955, and now Patent 2,859,127.

I claim:

1. Apparatus for developing an electrostatic image comprising a cloud generator, means for charging cloud particles, a development electrode and support means to receive and support an electrostatic image-bearing member adjacent to the development electrode and closely spaced therefrom thereby defining a development zone relative to the development electrode, walls defining an entrance chamber at one end of the electrode and forming a slot connecting said development zone and said entrance chamber, the length of the chamber corresponding roughly to the side of the image-bearing portion of the image-bearing member lying parallel to the chamber, the slot being approximately the same length as the chamber, means to feed charged cloud particles into the chamber, and means to add additional air to the chamber at a point no closer to the entrance slot than the point where the cloud particles enter the chamber.

2. Apparatus for developing an electrostatic image comprising a cloud generator, means for charging cloud particles, a development electrode and support means to receive and support an electrostatic image-bearing member adjacent to the development electrode and closely spaced therefrom at a distance of no more than $1/8''$ thereby defining a development zone relative to the development electrode, walls defining an entrance chamber at one end of the electrode and forming a slot connecting said development zone and said entrance chamber, the length of the chamber corresponding roughly to the side of the image-bearing portion of the image-bearing member lying parallel to the chamber, the slot being approximately the same length as the chamber, means to feed charged cloud particles into the chamber, and means to add additional air to the chamber at a point no closer to the entrance slot than the point where the cloud particles enter the chamber.

3. Apparatus for developing an electrostatic image comprising a cloud generator, means for charging cloud particles, a development electrode and support means to receive and support an electrostatic image-bearing member adjacent to the development electrode and closely spaced therefrom at a distance of no more than $1/40''$ thereby defining a development zone relative to the development electrode, walls defining an entrance chamber at one end of the electrode and forming a slot connecting said development zone and said entrance chamber, the length of the chamber corresponding roughly to the side of the image-bearing portion of the image-bearing member lying parallel to the chamber, the slot being approximately the same length as the chamber, means to feed charged cloud particles into the chamber, and means to add additional air to the chamber at a point no closer to the entrance slot than the point where the cloud particles enter the chamber.

4. Apparatus for developing an electrostatic image comprising a cloud generator, means for charging cloud particles, a development electrode and support means to receive and support an electrostatic image-bearing member adjacent to the development electrode and closely spaced therefrom thereby defining a development zone relative to the development electrode, walls defining an entrance chamber at one end of the electrode and forming a slot connecting said development zone and said entrance chamber, the length of the chamber corresponding roughly to the side of the image-bearing portion of the image-bearing member lying parallel to the chamber, the slot being the same length as the chamber, means to feed charged cloud particles into the chamber, means to add additional air to the chamber at a point no closer to the entrance slot than the point where the cloud particles enter the chamber, and exhaust means at the end of the development electrode opposite to the entrance slot.

5. Apparatus for developing an electrostatic image comprising a cloud generator, means for charging cloud particles, a development electrode and support means to receive and support an electrostatic image-bearing member adjacent to the development electrode and closely spaced therefrom thereby defining a development zone relative to the development electrode, walls defining an entrance chamber at one end of the electrode and forming a slot connecting said development zone and said entrance chamber, the length of the chamber corresponding roughly to the side of the image-bearing portion of the image-bearing member lying parallel to the chamber, the slot being the same length as the chamber, means to feed charged cloud particles into the chamber, means to add additional air to the chamber at a point no closer to the entrance slot than the point where the cloud particles enter the chamber, exhaust means at the end of the development electrode opposite to the entrance slot, and means to lower the air pressure at the exhaust.

References Cited in the file of this patent

UNITED STATES PATENTS

| | | |
|---|---|---|
| 2,577,894 | Jacob | Dec. 11, 1951 |
| 2,691,345 | Huebner | Oct. 12, 1954 |
| 2,725,304 | Landrigan et al. | Nov. 29, 1955 |
| 2,808,023 | Hayford | Oct. 1, 1957 |
| 2,824,545 | Ricker | Feb. 25, 1958 |